United States Patent
Li et al.

(10) Patent No.: US 12,540,077 B2
(45) Date of Patent: Feb. 3, 2026

(54) METHOD OF PREPARING FERRIC PHOSPHATE FROM IRON-CONTAINING WASTE

(71) Applicant: GUIZHOU CHANHEN CHEMICAL CORPORATION, Guizhou (CN)

(72) Inventors: Jin Li, Guizhou (CN); Jiacai Wang, Guizhou (CN); Shengping Wu, Guizhou (CN); Maogang Li, Guizhou (CN); Shunfang Li, Guizhou (CN); Luming Jian, Guizhou (CN); Jun Hou, Guizhou (CN)

(73) Assignee: GUIZHOU CHANHEN CHEMICAL CORPORATION, Guizhou (CN)

( * ) Notice: Subject to any disclaimer, the term of this patent is extended or adjusted under 35 U.S.C. 154(b) by 821 days.

(21) Appl. No.: 17/883,970

(22) Filed: Aug. 9, 2022

(65) Prior Publication Data

US 2023/0077925 A1     Mar. 16, 2023

(30) Foreign Application Priority Data

Sep. 15, 2021    (CN) .......................... 202111080723.3

(51) Int. Cl.
*C01B 25/37*     (2006.01)
*C01F 11/46*     (2006.01)
*C05B 7/00*      (2006.01)

(52) U.S. Cl.
CPC .......... *C01B 25/375* (2013.01); *C01F 11/468* (2013.01); *C05B 7/00* (2013.01)

(58) Field of Classification Search
CPC ...... C01B 25/375; C01F 11/468; C01F 11/46; C05B 7/00; Y02W 30/84; Y02E 60/10
See application file for complete search history.

(56) References Cited

U.S. PATENT DOCUMENTS 2,063,029 A     12/1936   Coleman et al.
2011/0011703 A1  1/2011   Kageyama et al.
(Continued)

FOREIGN PATENT DOCUMENTS

CN       103825024 A       5/2014
CN       103864469 A   *   6/2014
(Continued)

OTHER PUBLICATIONS

Machine translation of CN-103864469-A (Year: 2014).*
(Continued)

*Primary Examiner* — Sally A Merkling
*Assistant Examiner* — Logan Laclair
(74) *Attorney, Agent, or Firm* — Buchanan Ingersoll & Rooney PC (57) ABSTRACT

A method of preparing ferric phosphate from iron-containing waste, including: step a) providing a ferric chloride-containing mixture solution obtained from acidolysis of iron-containing waste; step b) adjusting pH of the ferric chloride-containing mixture solution to satisfy $0<pH\leq2$ and $Fe^{3+}$ concentration to 10-80 g/L with an alkaline compound and water, to obtain an iron source solution; step c) mixing and reacting the iron source solution obtained from the step b) with a solution of calcium dihydrogen phosphate in a molar ratio of P to Fe of 1:1-1.8, to obtain a slurry with a pH of 0.2-2; and step d) performing aging and crystal transformation on the slurry, to obtain ferric phosphate. A battery-grade ferric phosphate with high purity and good product quality can be obtained without the need for deep purification of raw materials.

10 Claims, 3 Drawing Sheets

(56) References Cited

U.S. PATENT DOCUMENTS

| | | | |
|---|---|---|---|
| 2011/0117003 A1 | 5/2011 | Wissemborski et al. | |
| 2012/0039783 A1 | 2/2012 | Bühler et al. | |
| 2013/0157134 A1 | 6/2013 | Kintaka | |
| 2017/0291826 A1* | 10/2017 | Demopoulos | ........... C22B 59/00 |

FOREIGN PATENT DOCUMENTS

| | | | | |
|---|---|---|---|---|
| CN | 104310358 A | | 1/2015 | |
| CN | 105772484 A | | 7/2016 | |
| CN | 105948009 A | | 9/2016 | |
| CN | 107317029 A | | 11/2017 | |
| CN | 109626350 A | | 4/2019 | |
| CN | 109761209 A | | 5/2019 | |
| CN | 109809381 A | | 5/2019 | |
| CN | 109928375 A | | 6/2019 | |
| CN | 110683528 A | | 1/2020 | |
| CN | 112250053 A | * | 1/2021 | ........ H01M 10/0525 |
| RU | 2479485 C2 | | 4/2013 | |
| RU | 2530126 C2 | | 10/2014 | |

OTHER PUBLICATIONS

Machine translation of CN-112250053-A (Year: 2021).*

Wu et al., "Preparation and Composition Control of Multi-metal-doped Iron Phosphate by Acidolysis of Steel Slag", The Chinese Journal of Process Engineering, (Jun. 15, 2011), vol. 11, No. 3, pp. 414-421. (with English abstract).

Office Action (First Office Action) issued Dec. 19, 2023, by the State Intellectual Property Office of People's Republic of China in corresponding Chinese Patent Application No. 202111080723.3 and an English translation of the Office Action. (14 pages).

Preliminary Search Report and Written Opinion issued on Aug. 7, 2024 by the National Institute of Industrial Property in corresponding French Patent Application No. FR 2208233, and an English Translation, 16 pages.

Russian Office Action for Russian Application No. 2022122845, dated Feb. 14, 2023 with translation, 12 pages.

Almeida et al., "Production of a ferric chloride coagulant by leaching an iron ore tailing", Minerals Engineering, (Jun. 6, 2020), vol. 156, 106511, pp. 1-5.

Al-Othman et al., "Gypsum crystallization and hydrochloric acid regeneration by reaction of calcium chloride solution with sulfuric acid", Hydrometallurgy, (Sep. 4, 2008), vol. 96, Issue 1-2, pp. 95-102.

Zhang et al., "Thermodynamic modeling of ferric phosphate precipitation for phosphorus removal and recovery from wastewater", Journal of Hazardous Materials, (Nov. 13, 2009), vol. 176, Issue 1-3, pp. 444-450.

Office Action (Examination Report) issued Aug. 26, 2025, by the Patent Office, Government of India, in corresponding India Patent Application No. 202214047298 with an English Translation of the Office Action. (7 pages).

* cited by examiner

METHOD OF PREPARING FERRIC PHOSPHATE FROM IRON-CONTAINING WASTE

CROSS REFERENCE TO RELATED APPLICATIONS

This application claims benefit of priority to Chinese Patent Application No. 202111080723.3, filed Sep. 15, 2021. The contents of this application are incorporated herein by reference.

FIELD OF THE INVENTION

The present disclosure relates to the technical field of waste utilization, and specifically to a method of preparing ferric phosphate from iron-containing waste.

BACKGROUND OF THE INVENTION

In recent years, the demand for power lithium-ion batteries has continuously increased with the rapid development of new energy vehicles. Lithium ferric phosphate, with the structure of olivine, stable properties and a long cycle life, has been preferentially chosen for new energy electric commercial vehicle power sources and energy storage power stations. In China, lithium ferric phosphate is mostly prepared by using ferric phosphate as raw materials. Ferric phosphate ($FePO_4$), also known as ferric orthophosphate, in which iron is ferric iron, is mainly in a form of dihydrate, and it is insoluble in acids other than sulfuric acid and almost insoluble in water, acetic acid and alcohols. $LiFePO_4$ is the most promising positive electrode material for lithium-ion batteries, owing to its high safety, long cycle life, environmental friendliness and low cost, and its precursor $FePO_4$ also has attracted people's attention, by virtue of its features including non-toxicity, low cost, and stable structure.

The current method of preparing ferric phosphate mainly includes the co-precipitation method and hydrothermal method. The co-precipitation method refers to a process involving adding a precipitant to a solution containing two or more cations which are present in a homogeneous form, and performing precipitation reaction to obtain uniform precipitation of each ingredient. This method is the typical method for preparing $FePO_4$, following the process of dissolving an iron source and a phosphorus source, adding other compounds to precipitate them, and then washing, drying, and calcining to obtain the product. The hydrothermal method, as wet chemical method, occurs in an autoclave with an atmosphere of high temperature and high-pressure, and thus enables insoluble substances to dissolve and recrystallize in this reaction system. From the perspective of raw materials, the preparation process of commercially available ferric phosphate is mostly to make metal iron into an iron salt, make the iron salt into ferric hydroxide, and then react the ferric hydroxide with phosphoric acid to prepare ferric phosphate, or perform a metathesis reaction of the iron salt and a phosphate to prepare ferric phosphate.

Patent CN109928375A, which is incorporated herein by reference, discloses a method for preparing ferric phosphate by using a divalent iron source and an intermediate product $Ca(H_2PO_4)_2$ from the wet process for producing phosphoric acid, comprising mixing calcium dihydrogen phosphate powders with ferrous ion solution to obtain a solid-liquid mixed phase. In the solid-liquid reaction system, since the precipitated ferric phosphate is solid, which is easily adhered to other solid phases, the ferric phosphate has a high content of calcium impurity.

SUMMARY OF THE INVENTION

In view of this, the technical problem to be solved by the present invention is to provide a method of preparing ferric phosphate from iron-containing waste. The method provided by the present disclosure eliminates complicated impurity removal processes and produces ferric phosphate with a lower impurity content and better morphology.

In existing techniques, ferrous ion and phosphorus source are generally used to synthesize battery-grade iron phosphate. Few reports show that ferric ion directly carries out metathesis reaction with phosphate. This may be ascribed to the easy hydrolyzation of ferric ions. The acidity has to be increased in order to prevent the hydrolysis. When the acidity in the solution increased, the concentration of phosphate radical is lower, because the phosphate radical would be converted into $H_3PO_4$, which made it difficult to obtain ferric phosphate precipitation. Moreover, when ferric phosphate is prepared from iron-containing waste as raw material, impurity ions will also affect whether ferric phosphate can be prepared and its purity. The inventors found in their researches that when ferric phosphate is prepared from a ferric ions solution containing impurities and a calcium phosphate salt solution, the ferric phosphate could not only be prepared through process control, but also needs no purification from the impurities in the ferric ion solution to produce high-quality ferric phosphate.

The present disclosure provides a method of preparing ferric phosphate from iron-containing waste, which comprises:
step a) providing a ferric chloride-containing mixture solution obtained from acidolysis of iron-containing waste;
step b) adjusting pH of the ferric chloride-containing mixture solution to satisfy $0<pH\leq2$ and $Fe^{3+}$ concentration to 10-80 g/L with an alkaline compound and water, to obtain an iron source solution;
step c) mixing and reacting the iron source solution obtained from the step b) with a solution of calcium dihydrogen phosphate in a molar ratio of P to Fe of 1:1-1.8, to obtain a slurry with a pH of 0.2-2; and
step d) performing aging and crystal transformation on the slurry, to obtain ferric phosphate.

According to the present disclosure, a ferric chloride-containing solution obtained from acidolysis of iron-containing waste is used as raw materials, and it is treated with an "excess alkali", e.g., an alkaline compound is used to neutralize excess HCl, and its pH value is adjusted to be greater than 0 and less than or equal to 2, and the ferric ion concentration is adjusted to 10-80 g/L. It can be directly used as an iron source for the synthesis of ferric phosphate, without the need for impurity removal treatments such as extraction and precipitation, and carries out liquid-liquid reaction with a calcium dihydrogen phosphate solution to obtain high-quality ferric phosphate.

In an embodiment, the ferric chloride-containing mixture solution is obtained by acidolysis of iron-containing waste. The ferric chloride-containing mixture solution contains impurity ions apart from $Fe^{3+}$ and $Cl^-$. The species and content of the impurity ions depend on the source of the iron-containing waste.

In an embodiment, in order not to affect the quality of subsequent ferric phosphate, the impurity ions include, but is not limited to, one or more of $Mn^{2+}$, $Ni^{2+}$, $K^+$, $Na^+$, $Mg^{2+}$, $Cu^{2+}$, $Zn^{2+}$, $Al^{3+}$ and $Ca^{2+}$. In an embodiment, the impurity ions include $Mn^{2+}$, $Ni^{2+}$, $K^+$, $Na^+$, $Mg^{2+}$, $Cu^{2+}$, $Zn^{2+}$ and $Al^{3+}$.

Specifically, the ferric chloride-containing mixture solution in step a) contains 100-200 g/L of $Fe^{3+}$, 200-500 g/L of $Cl^-$ and impurity ions. The impurity ions include one or more of $Mn^{2+}$ under 2000 ppm, $Ni^{2+}$ under 500 ppm, $K^+$ under 2000 ppm, $Na^+$ under 2000 ppm, $Mg^{2+}$ under 2000 ppm, $Cu^{2+}$ under 500 ppm, $Zn^{2+}$ under 500 ppm and $Al^{3+}$ under 500 ppm.

Preferably, the ferric chloride-containing mixture solution in step a) contains 100-200 g/L of $Fe^{3+}$, 200-500 g/L of $Cl^-$ and impurity ions. The impurity ions include one or more of $Mn^{2+}$ under 1000 ppm, $Ni^{2+}$ under 300 ppm, $K^+$ under 1000 ppm, $Na^+$ under 1000 ppm, $Mg^{2+}$ under 1000 ppm, $Cu^{2+}$ under 300 ppm, $Zn^{2+}$ under 300 ppm and $Al^{3+}$ under 300 ppm.

In an embodiment, the iron-containing waste is selected from phosphorus iron, iron slag scrap, pyrite slag, iron oxide red waste, iron-containing chemical sludge or the like.

Ferrophosphorus is an alloy formed by phosphorus and iron, which can be a mineral or its smelting product, and also can be the by-product from phosphorus chemical industry for producing yellow phosphorus or calcium magnesium phosphate fertilizer or silicate chemical industry. The electric furnace phosphorus production process will produce yellow phosphorus and by-product ferrophosphorus, in which the Fe content is about 70%, and the P content is about 18~26%. When ferrophosphorus is used as raw materials, the ferrophosphorus is subjected to acidolysis to obtain the ferric chloride-containing mixture solution. The process specifically includes dissolving the ferrophosphorus into hydrochloric acid to obtain ferrous chloride, and oxidizing ferrous ions in the acid solution into ferric ions, or dissolving the ferrophosphorus into hydrochloric acid while introducing an oxidizing gas to obtain a ferric chloride solution.

Iron slag scrap also may be used as raw materials to prepare the ferric chloride-containing mixture solution, comprising subjecting the iron slag scrap to acidolysis to obtain the ferric chloride-containing mixture solution. The acidolysis specifically comprises: dissolving the iron slag scrap in hydrochloric acid to obtain ferrous chloride and oxidizing ferrous ions in the acid solution into ferric ions; or dissolving iron-containing metal waste in hydrochloric acid while introducing an oxidizing gas to obtain a ferric chloride solution.

Pyrite slag is the slag produced in the process of making acid from pyrite, containing a large amount of iron mainly in the form of $Fe_2O_3$ in addition to $SiO_2$, CaO, MgO, $Al_2O_3$, etc. For example, a typical pyrite slag contains about 90% of $Fe_2O_3$, about 5% of $SiO_2$, about 1% of CaO, about 1% of MgO, about 1% of $Al_2O_3$, and about 2% of other impurities.

When the pyrite slag is used as raw materials, the pyrite slag is treated to obtain the ferric chloride-containing mixture solution. The treatment specifically comprises leaching the pyrite slag with hydrochloric acid, dissolving $Fe_2O_3$, and leaching out ferric ions to obtain a mixture solution containing ferric chloride and other impurities:

$$Fe_2O_3 + 6HCl = 2FeCl_3 + 3H_2O.$$

In other embodiments, when pyrite slag contains $Fe_3O_4$ and FeO in addition to $Fe_2O_3$, hydrochloric acid can be used to leach out ferric ions and ferrous ions first, and then the ferrous ions are oxidized to ferric ions. A specific method for oxidizing ferrous ions to ferric ions may be to introduce hydrogen peroxide into the hydrochloric acid leaching solution.

Iron oxide red waste mainly comes from iron and steel plants, containing iron oxide as a main component and also containing Ni, Mn, Zn, Cr, etc.

When iron oxide red waste or pickling iron oxide red is used as raw materials, the iron oxide red waste is treated to obtain the ferric chloride-containing mixture solution. The treatment specifically comprises leaching iron oxide red waste with hydrochloric acid, dissolving $Fe_2O_3$, and leaching out ferric ions, to obtain a mixture solution containing ferric chloride and other impurities. Iron-containing chemical sludge is the pickling sludge from the metal surface treatment industry, containing Fe, lead, zinc and so on. When iron-containing chemical sludge is used as raw materials, the iron-containing chemical sludge is treated to obtain the ferric chloride-containing mixture solution. The treatment specifically comprises: leaching the iron-containing chemical sludge with hydrochloric acid to obtain a ferrous ions-containing solution, and oxidizing ferrous ions into ferric ions.

In the present disclosure, the above-mentioned iron-containing waste material is used as a raw material, and hydrochloric acid is used to carry out acid hydrolysis and optionally oxidation treatment to obtain a mixed solution of ferric chloride containing the above-mentioned impurity ions, and no other impurity removal treatment is required.

After the ferric chloride-containing mixed solution is obtained, the pH value and the concentration thereof are adjusted by using an alkaline compound and water, so that the pH value is greater than 0 and less than or equal to 2, and the ferric ion concentration is 10-80 g/L. On the one hand, the alkaline compound will neutralize the free HCl in the ferric chloride-containing mixture solution; and on the other hand, it provides $OH^-$ to produce an overbased condition, which provides necessary conditions for the subsequent formation of iron phosphate. In an embodiment, the pH value of the ferric chloride-containing mixture solution is adjusted to 0.5-2 and the ferric ion concentration is 15-75 g/L.

In an embodiment, the alkaline compound is selected from a calcium-containing alkaline compound, a sodium-containing alkaline compound, a potassium-containing alkaline compound or the like, preferably a calcium-containing alkaline compound. The calcium-containing alkaline compound includes lime cream, lime and limestone. Lime cream, also known as hydrated lime, lime water, or slaked lime, is a suspension of calcium hydroxide formed by adding water to calcium oxide, with calcium hydroxide as its main component. Lime, also known as quick lime, has calcium oxide as its main component. Limestone has calcium carbonate as its main component. In an embodiment, the calcium-containing alkaline compound is selected from lime cream. In an embodiment, the lime cream has a concentration of 10-15%.

In the present disclosure, the iron source solution obtained in step b) is directly used for the subsequent preparation of ferric phosphate without further purification. The iron source solution contains 10-80 g/L of $Fe^{3+}$, 25-200 g/L of $Cl^-$ and impurity ions. The impurity ions include one or more of $Mn^{2+}$ under 500 ppm, $Ni^{2+}$ under 200 ppm, $K^+$ under 500 ppm, $Na^+$ under 500 ppm, $Mg^{2+}$ under 500 ppm, $Cu^{2+}$ under 200 ppm, $Zn^{2+}$ under 200 ppm and $Al^{3+}$ under 200 ppm.

Specifically, in an embodiment, the iron source solution contains 10-80 g/L of $Fe^{3+}$, 25-200 g/L of $Cl^-$ and impurity ions. The impurity ions include one or more of $Mn^{2+}$ under 100 ppm, $Ni^{2+}$ under 50 ppm, $K^+$ under 100 ppm, $Na^+$ under 100 ppm, $Mg^{2+}$ under 200 ppm, $Cu^{2+}$ under 50 ppm, $Zn^{2+}$ under 100 ppm and $Al^{3+}$ under 200 ppm.

In this application, the calcium dihydrogen phosphate solution is used as a phosphorus source solution. In an embodiment, the calcium dihydrogen phosphate solution has a pH of 2.5-3.0, and a molar ratio of $P_2O_5$ to $F^-$ of ≥250.

In an embodiment, the calcium dihydrogen phosphate solution can be produced from wet-process phosphoric acid. For example, the calcium dihydrogen phosphate solution is obtained by mixing and reacting wet-process phosphoric acid with a calcium-containing alkaline compound.

In the preparation of calcium dihydrogen phosphate, the calcium-containing alkaline compound is selected from one or more of lime, lime cream, limestone, calcium phosphate and phosphate rock, preferably lime cream.

The obtained iron source solution and calcium dihydrogen phosphate solution are mixed in a molar ratio of P to Fe of 1:1-1.8, to perform a metathesis reaction:

In an embodiment, the metathesis reaction is performed at a temperature of 60-70° C. for a duration of 0.5-2 h. After completion of the reaction, a slurry with a pH of 0.2-2 is obtained.

The inventors surprisingly found that spherical-like ferric phosphate particles with high purity, few impurity ions and good morphology consistency but no apparent agglomeration phenomenon can be produced by carrying out liquid-phase reaction of the high-impurity mixed solution containing ferric chloride and other impurities as the iron source and the calcium dihydrogen phosphate solution as the phosphorus source, adjusting the pH of the high amount-impurity mixed solution with alkaline compound and water so that the pH satisfies 0<pH≤2 and its ferric ion concentration is 10-80 g/L, and then mixing and reacting in a molar ratio of P to Fe of 1:1-1.8, in which the impurity ions therein will not follow the ferric phosphate precipitation to enter into the product.

After the metathesis reaction is completed, the obtained slurry is subjected to aging and crystal transformation. In an embodiment, the aging and crystal transformation is performed at a temperature of 80-99° C. for a duration of 2-4 h.

The slurry after the aging and crystal transformation is subjected to solid-liquid separation, and the obtained solid is washed by an on-line washing process or a pulping washing process to obtain ferric phosphate dihydrate.

In an embodiment, the washed ferric phosphate dehydrate can be further dried and calcined, to obtain anhydrous ferric phosphate.

In an embodiment, after the solid-liquid separation, the method further includes: mixing and reacting mother liquor obtained after solid-liquid separation in step d) with an alkaline compound to obtain white fertilizer.

After the solid-liquid separation, the mother solution contains a large amount of calcium chloride and hydrochloric acid, which can be mixed and reacted with an alkaline compound to obtain a by-product white fertilizer, thereby reducing the generation of waste liquid.

In an embodiment, the white fertilizer is specifically prepared by a process comprising adding the alkaline compound to the mother solution to adjust pH to 6-12, and filtering and separating to obtain calcium hydrogen phosphate, which is the white fertilizer, and a second filtrate.

The alkaline compound includes a calcium-containing alkaline compound, a sodium-containing alkaline compound or a potassium-containing alkaline compound, preferably a calcium-containing alkaline compound, such as lime or calcium carbonate. In the present disclosure, the above-mentioned process is not particularly limited, and those skilled in the art can adjust the parameters according to the properties of the mother liquor.

In an embodiment, after the white fertilizer is obtained, the method further comprises mixing and reacting the liquid obtained after separating out the white fertilizer with sulfuric acid to obtain white gypsum.

In the present disclosure, after the white fertilizer is obtained according to the processes described above, the method further comprises mixing and reacting the liquid obtained after separating out the white fertilizer with sulfuric acid, to obtain white gypsum and hydrochloric acid.

In an embodiment, after the white gypsum is obtained, the method further comprises recycling the hydrochloric acid obtained after separating out the white gypsum.

Specifically, the hydrochloric acid can be used for acidolysis of iron-containing waste.

Figure 1:
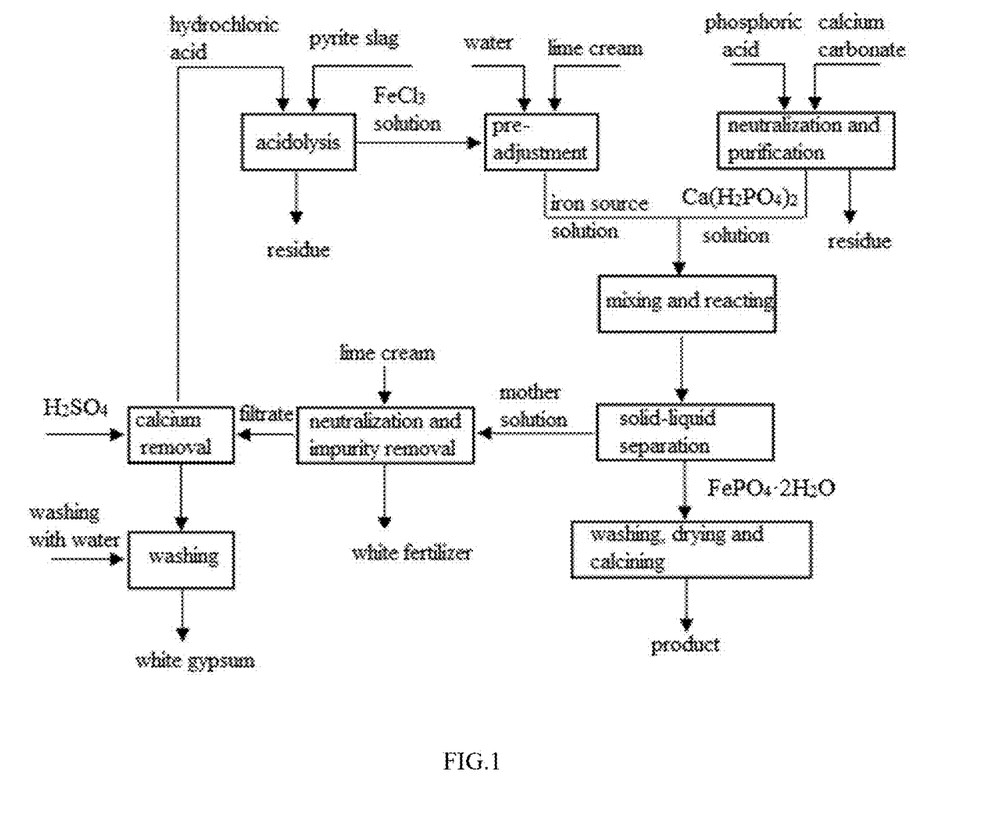
FIG. 1 is a flowchart showing a typical process of preparing ferric phosphate from iron-containing waste according to an embodiment of the present disclosure.

Referring to FIG. 1, FIG. 1 is a flowchart showing a typical process for preparing ferric phosphate from iron-containing waste according to an embodiment of the present disclosure. Iron-containing waste such as pyrite slag, as the raw material, is acid-hydrolyzed with hydrochloric acid to obtain a ferric chloride-containing solution and a waste residue. Subsequently, the obtained ferric chloride-containing solution is pre-adjusted with an alkaline compound, e.g., lime cream and water, to obtain an iron source solution with a pH of 0-2 and an ferric ion concentration of 10-80 g/L. Phosphoric acid, e.g., defluorinated wet-process phosphoric acid, is reacted with an calcium-containing alkaline compound, e.g., calcium carbonate or calcium oxide, to obtain a calcium dihydrogen phosphate solution, with pH of the calcium dihydrogen phosphate solution controlled at 2.5-3.0 and the molar ratio of $P_2O_5$ to $F^-$≥250. Subsequently, the iron source solution and the calcium dihydrogen phosphate solution are mixed and reacted in a molar ratio of P to Fe of 1:1-1.8, to obtain a slurry with a pH of 0.2-2. The obtained slurry is subjected to aging and crystal transformation and solid-liquid separation, to obtain a solid which is a ferric phosphate crude product. The ferric phosphate crude product is washed, dried and calcined to obtain ferric phosphate with high purity and low content of impurity ions. The solution obtained from the solid-liquid separation is a $CaCl_2$) solution, to which an alkaline compound, such as lime cream is added to adjust its pH to 6-12, and then the mixture is filtrated to obtain a solid white fertilizer and a filtrate. Sulfuric acid is added to the filtrate and the mixture is subjected to solid-liquid separation, to obtain a solution which is hydrochloric acid and a solid which is white gypsum. The obtained hydrochloric acid can be reused for acidolysis of the iron-containing waste.

In the existing techniques for preparing ferric phosphate from calcium dihydrogen phosphate and an iron source, generally ferrous ions and calcium dihydrogen phosphate are reacted. Ferrous ions and phosphate radical ions are reacted, to obtain ferrous dihydrogen phosphate ($Fe(H_2PO_4)_2$) which has good solubility but unstability. Subsequently, the ferrous dihydrogen phosphate is oxidized by adding an oxidizing agent to directly prepare ferric phosphate precipitate, so that the product is separated and precipitated from the mixed system.

In the present disclosure, ferric ions and a phosphorus salt solution are employed to perform a liquid-phase reaction in a hydrochloric acid system. The salt formed from chloride ion in the hydrochloric acid system mostly has good solubility to reduce the content of other impurity ions in the solid-phase ferric phosphate product. The invention adopts the liquid-liquid reaction system of a ferric ion salt with high content of impurities and easy hydrolyzation and calcium dihydrogen phosphate, controlling and shielding the influence of impurity ions in a multi-stage process, so that battery-grade ferric phosphate with high purity and good product quality can be obtained without the need for deep purification of raw materials. The process design concept according to the present disclosure differs from the conventional production route using pure iron sources, and also from the ferric phosphate preparation system using ferrous ion sources. In addition, calcium reagents are preferred in the process steps to avoid introducing sodium ions and potassium ions, so that the product contains significantly less sodium and potassium than the existing commercial products.

In the present disclosure, during the preparation of ferric phosphate from iron-containing waste, the iron-containing waste, as the raw material, is firstly prepared with hydrochloric acid into a ferric ion-containing solution, and the ferric ion-containing solution is used as the iron source to perform the liquid-liquid reaction with the calcium dihydrogen phosphate solution, so that a reaction system, which is different from the conventional system using ferrous ion sources and phosphorus sources and reduces cost for producing ferric phosphate, is developed. Additionally, the impurity ions in the raw materials are well shielded through the process control, and ferric phosphate with high purity can be obtained without the need for extra impurity removal or purification treatments such as extraction and precipitation, which simplifies the preparation process and improves the production efficiency. Moreover, during the preparation of iron phosphate, by-products white fertilizer and gypsum are produced, and at the same time, the produced hydrochloric acid is recycled, thereby decreasing the discharge of wastewater and waste liquid in the preparation process, and reducing the cost and damage to the environment.

DETAILED DESCRIPTION OF THE INVENTION

Hereinafter, the method of preparing ferric phosphate from iron-containing waste provided by the present disclosure will be described further in conjunction with examples.

The compositions of the pyrite slag used in the following examples are shown in Table 1. The components of raw materials used in examples and comparative examples are set forth in Table 1.

TABLE 1

Components of Raw Materials Used in Examples and Comparative Examples

| | Unit | % | ppm | | | | | | | | |
|---|---|---|---|---|---|---|---|---|---|---|---|
| No. | Stage | Fe | Cl | Mn | Ni | K | Na | Mg | Cu | Zn | Al | Ca |
| Pyrite slag | | 55.86 | / | 621 | 19 | 409 | 217 | 502 | 12 | 602 | 1624 | 4267 |
| Example 1 | Acidolysis Solution | 130 | 290 | 132 | 4 | 109 | 50 | 153 | 3 | 141 | 414 | 926 |
| | Neutralized Acidolysis Solution | 10 | 25 | 14 | 1 | 13 | 10 | 55 | 0 | 14 | 42 | 4727 |
| Example 2 | Acidolysis Solution | 129 | 305 | 138 | 4 | 114 | 53 | 161 | 4 | 148 | 435 | 973 |
| | Neutralized Acidolysis Solution | 20 | 46 | 21 | 1 | 19 | 16 | 82 | 1 | 21 | 62 | 7027 |
| Example 3 | Acidolysis Solution | 146 | 326 | 148 | 4 | 122 | 56 | 172 | 4 | 159 | 466 | 1041 |
| | Neutralized Acidolysis Solution | 40 | 102 | 41 | 1 | 37 | 30 | 158 | 1 | 40 | 119 | 13520 |
| Example 4 | Acidolysis Solution | 150 | 335 | 152 | 5 | 125 | 58 | 177 | 4 | 163 | 479 | 1070 |
| | Neutralized Acidolysis Solution | 60 | 161 | 45 | 2 | 41 | 33 | 174 | 1 | 44 | 131 | 14872 |
| Example 5 | Acidolysis Solution | 167 | 373 | 149 | 5 | 123 | 57 | 173 | 4 | 160 | 470 | 1051 |
| | Neutralized Acidolysis Solution | 80 | 200 | 54 | 2 | 49 | 39 | 205 | 2 | 52 | 154 | 17576 |
| Comparative Example 1 | Acidolysis Solution | 146 | 326 | 148 | 4 | 122 | 56 | 172 | 4 | 159 | 466 | 1041 |
| | Neutralized Acidolysis Solution | 40 | 102 | 41 | 1 | 37 | 30 | 158 | 1 | 40 | 119 | 284 |
| Comparative Example 2 | Acidolysis Solution | 146 | 326 | 148 | 4 | 122 | 56 | 172 | 4 | 159 | 466 | 1041 |
| | Neutralized Acidolysis Solution | 40 | 102 | 41 | 1 | 37 | 30 | 158 | 1 | 40 | 119 | 284 |

Example 1

Preparation of a Fe salt: The pyrite slag was subjected to acidolysis using hydrochloric acid, to obtain an acidolysis solution, whose composition is shown in Table 1. To the acidolysis solution, 12% of lime cream solution was added dropwise to neutralize redundant HCl, and then water was added to adjust its pH to 2 and ferric ion concentration to 10 g/L to obtain an iron source solution. The composition of the iron source solution is shown in Table 1.

Preparation of a P salt: Wet-process phosphoric acid was mixed with calcium carbonate and calcium oxide to perform neutralization treatment. After separating impurities, a solution with a $P_2O_5/F$ of 250 was obtained, to which pure water was added to adjust pH to 2.61 and P concentration to 32 g/L.

The Fe salt and P salt were subjected to the synthesis reaction at a ratio of n P/Fe=1.05, in which the synthesis temperature was 60° C., and the synthesis duration was 0.5 h. The aging temperature was 90° C., and the aging and crystal transformation duration was 4 h. The synthesis mother solution had a pH of 2. After the crystallization was completed, solid-liquid separation was performed using a separation device, and the product was washed by a combination of online washing and pulping washing.

The pH of the mother solution obtained from the separation of the product was adjusted with calcium hydroxide to 8 for neutralization and impurity removal, and the removed slag can be used as white fertilizer. The purified solution was then added with sulfuric acid to prepare high-quality calcium sulfate together with hydrochloric acid. The hydrochloric acid was recycled to the initial stage of the acidolysis of pyrite slag.

Example 2

Preparation of a Fe salt: The pyrite slag was subjected to acidolysis using hydrochloric acid to obtain an acidolysis solution, whose composition is shown in Table 1. To the acidolysis solution, 12% of lime cream solution was added dropwise to neutralize redundant HCl, and then water was added to adjust its pH to 1.5 and ferric ion concentration to 20 g/L to obtain an iron source solution. The composition of the iron source solution is shown in Table 1.

Preparation of a P salt: Wet-process phosphoric acid was mixed with calcium carbonate and calcium oxide to perform neutralization treatment. After separating impurities, a solution with a $P_2O_5/F$ of 255 was obtained, to which pure water was added to adjust pH to 2.62 and P concentration to 33 g/L.

The Fe salt and P salt were subjected to the synthesis reaction at a ratio of n P/Fe=1.15, in which the synthesis temperature was 65° C., and the synthesis duration was 0.9 h. The aging temperature was 93° C., and the aging and crystal transformation duration was 3 h. The synthesis mother solution had a pH of 1.6. After the crystallization was completed, solid-liquid separation was performed using a separation device, and the product was washed by a combination of online washing and pulping washing.

The pH of the mother solution obtained from the separation of the product was adjusted with calcium hydroxide to 10 for neutralization and impurity removal, and the removed slag can be used as white fertilizer. The purified solution was then added with sulfuric acid to prepare high-quality calcium sulfate together with hydrochloric acid. The hydrochloric acid was recycled to the initial stage of the acidolysis of pyrite slag.

Example 3

Preparation of a Fe salt: The pyrite slag was subjected to acidolysis using hydrochloric acid to obtain an acidolysis solution, whose composition is shown in Table 1. To the acidolysis solution, 12% of lime cream solution was added dropwise to neutralize redundant HCl, and then water was added to adjust its pH to 1 and ferric ion concentration to 40 g/L to obtain an iron source solution. The composition of the iron source solution is shown in Table 1.

Preparation of a P salt: Wet-process phosphoric acid was mixed with calcium carbonate and calcium oxide to perform neutralization treatment. After separating impurities, a solution with a $P_2O_5/F$ of 260 was obtained, to which pure water was added to adjust pH to 2.65 and P concentration to 35 g/L.

The Fe salt and P salt were subjected to the synthesis reaction at a ratio of n P/Fe=1.2, in which the synthesis temperature was 70° C., and the synthesis duration was 1 h. The aging temperature was 94° C., and the aging and crystal transformation duration was 2 h. The synthesis mother solution had a pH of 1. After the crystallization was completed, solid-liquid separation was performed using a separation device, and the product was washed by a combination of online washing and pulping washing.

The pH of the mother solution obtained from the separation of the product was adjusted with calcium hydroxide to 12 for neutralization and impurity removal, and the removed slag can be used as white fertilizer. The purified solution was then added with sulfuric acid to prepare high-quality calcium sulfate together with hydrochloric acid. The hydrochloric acid was recycled to the initial stage of the acidolysis of pyrite slag.

Figure 2:
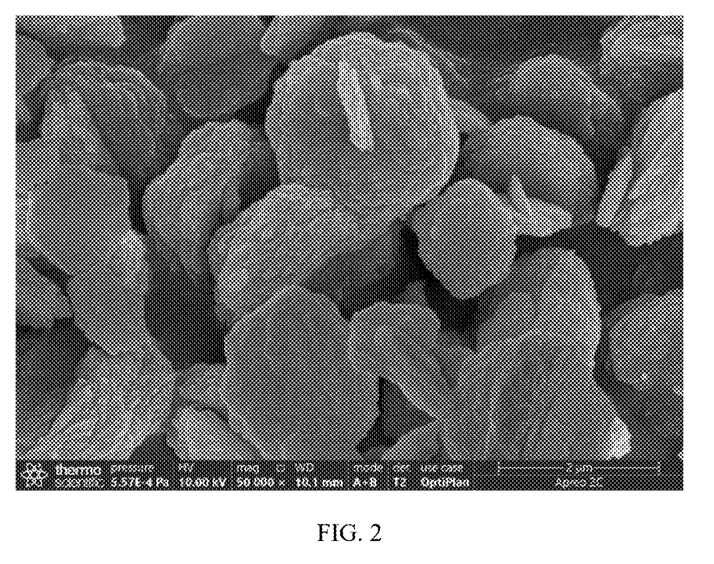
FIG. 2 is a scanning electron microscopy image, under 2 μm scale bar, of the ferric phosphate prepared in Example 3.
Figure 3:
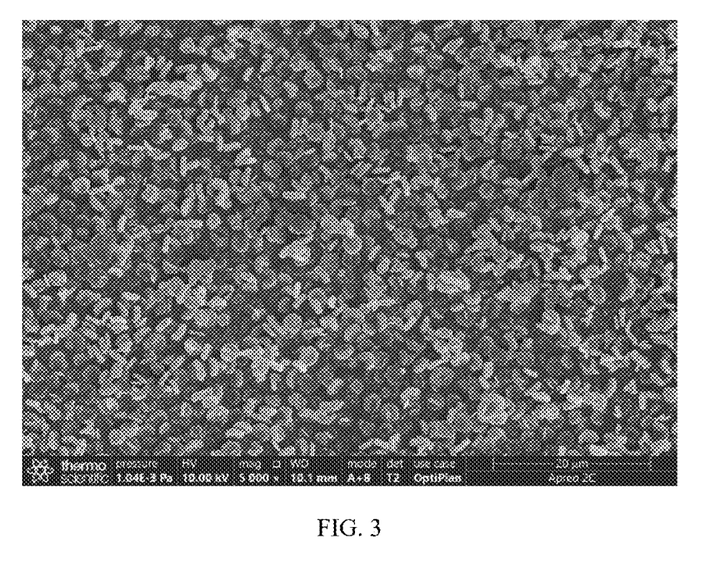
FIG. 3 is a scanning electron microscopy image, under 20 μm scale bar, of the ferric phosphate prepared in Example 3.

The product obtained from washing was dried and calcined to obtain ferric phosphate. The obtained ferric phosphate product was analyzed, and the results are shown in FIG. 2 and FIG. 3. FIG. 2 is a scanning electron microscopy image, under 2 μm scale bar, of the ferric phosphate prepared in Example 3. FIG. 3 is a scanning electron microscopy image, under 20 μm scale bar, of the ferric phosphate prepared in Example 3. It can be seen from FIG. 2 and FIG. 3 that the product prepared by the method according to the present disclosure is spherical-like particles with good morphology consistency but no apparent agglomeration phenomenon.

Example 4

Preparation of a Fe salt: The pyrite slag was subjected to acidolysis using hydrochloric acid to obtain an acidolysis solution, whose composition is shown in Table 1. To the acidolysis solution, 12% of lime cream solution was added dropwise to neutralize redundant HCl, and then water was added to adjust its pH to 0.5 and ferric ion concentration to 60 g/L to obtain an iron source solution. The composition of the iron source solution is shown in Table 1.

Preparation of a P salt: Wet-process phosphoric acid was mixed with calcium carbonate and calcium oxide to perform neutralization treatment. After separating impurities, a solution with a $P_2O_5/F$ of 280 was obtained, to which pure water was added to adjust pH to 2.7 and P concentration to 30 g/L.

The Fe salt and P salt were subjected to the synthesis reaction at a ratio of n P/Fe=1.6, in which the synthesis temperature was 65° C., and the synthesis duration was 1.5 h. The aging temperature was 99° C., and the aging and crystal transformation duration was 2 h. The synthesis mother solution had a pH of 0.8. After the crystallization was completed, solid-liquid separation was performed using a separation device, and the product was washed by a combination of online washing and pulping washing.

The pH of the mother solution obtained from the separation of the product was adjusted with calcium hydroxide to 6 for neutralization and impurity removal, and the removed slag can be used as white fertilizer. The purified solution was then added with sulfuric acid to prepare high-quality calcium sulfate together with hydrochloric acid. The hydrochloric acid was recycled to the initial stage of the acidolysis of pyrite slag.

Example 5

Preparation of a Fe salt: The pyrite slag was subjected to acidolysis using hydrochloric acid to obtain an acidolysis solution, whose composition is shown in Table 1. To the acidolysis solution, 12% of lime cream solution was added dropwise to neutralize redundant HCl, and then water was added to adjust its pH to 0.5 and ferric ion concentration to 80 g/L to obtain an iron source solution. The composition of the iron source solution is shown in Table 1.

Preparation of a P salt: Wet-process phosphoric acid was mixed with calcium carbonate and calcium oxide to perform neutralization treatment. After separating impurities, a solution with a $P_2O_5/F$ of 300 was obtained, to which pure water was added to adjust pH to 2.8 and P concentration to 28 g/L.

The Fe salt and P salt were subjected to the synthesis reaction at a ratio of n P/Fe=1.8, in which the synthesis temperature was 60° C., and the synthesis duration was 2 h. The aging temperature was 96° C., and the aging and crystal transformation duration was 2 h. The synthesis mother solution had a pH of 0.2. After the crystallization was completed, solid-liquid separation was performed using a separation device, and the product was washed by a combination of online washing and pulping washing.

The pH of the mother solution obtained from the separation of the product was adjusted with calcium hydroxide to 7 for neutralization and impurity removal, and the removed slag can be used as white fertilizer. The purified solution was then added with sulfuric acid to prepare high-quality calcium sulfate together with hydrochloric acid. The hydrochloric acid was recycled to the initial stage of the acidolysis of pyrite slag.

Comparative Example 1

Preparation of a Fe salt: The pyrite slag was subjected to acidolysis using hydrochloric acid to obtain an acidolysis solution, whose composition is shown in Table 1. To the acidolysis solution, water was added to adjust the ferric ion concentration to the one shown in Table 1, so that the pH value is less than 0 and the ferric ion concentration is 40 g/L, to obtain an iron source solution. The composition of the iron source solution is as shown in Table 1.

Preparation of a P salt: Wet-process phosphoric acid was mixed with calcium carbonate and calcium oxide to perform neutralization treatment. After separating impurities, a solution with a $P_2O_5/F$ of 260 was obtained, to which pure water was added to adjust pH to 2.65 and P concentration to 35 g/L.

The Fe salt and P salt were subjected to the synthesis reaction at a ratio of n P/Fe=1.2, in which the synthesis temperature was 70° C., and the aging temperature was 94° C. The aging and crystal transformation duration was 4 h, and the synthesis mother solution had a pH of 0.01. After the crystallization was completed, no ferric phosphate was produced due to the strong acidity of the slurry.

Comparative Example 2

Preparation of a Fe salt: The pyrite slag was subjected to acidolysis using hydrochloric acid to obtain an acidolysis solution, whose composition is shown in Table 1. To the acidolysis solution, water was added to adjust the ferric ion concentration to the one shown in Table 1, so that the pH value is less than 0 and the ferric ion concentration is 40 g/L, to obtain an iron source solution. The composition of the iron source solution is as shown in Table 1.

Preparation of a P salt: Wet-process phosphoric acid was mixed with calcium carbonate and calcium oxide to perform neutralization treatment. After separating impurities, a solution with a $P_2O_5/F$ of 260 was obtained. To there, pure water was added to adjust pH to 2.65 and P concentration to 35 g/L.

The Fe salt and P salt were subjected to the synthesis reaction at a ratio of n P/Fe=1.2, in which the synthesis temperature was 70° C. 12% of lime cream solution was added dropwise to adjust the pH of the slurry. The aging temperature was 94° C., and the aging and crystal transformation duration was 4 h. The synthesis mother solution had a pH of 1. After the crystallization was completed, a separation device was used for solid-liquid separation, and the product was washed by a combination of online washing and pulping washing.

The pH of the mother solution obtained from the separation of the product was adjusted with calcium hydroxide to 10 for neutralization and impurity removal, and the removed slag can be used as white fertilizer. The purified solution was then added with sulfuric acid to prepare high-quality calcium sulfate together with hydrochloric acid. The hydrochloric acid was recycled to the initial stage of the acidolysis of pyrite slag.

Figure 4:
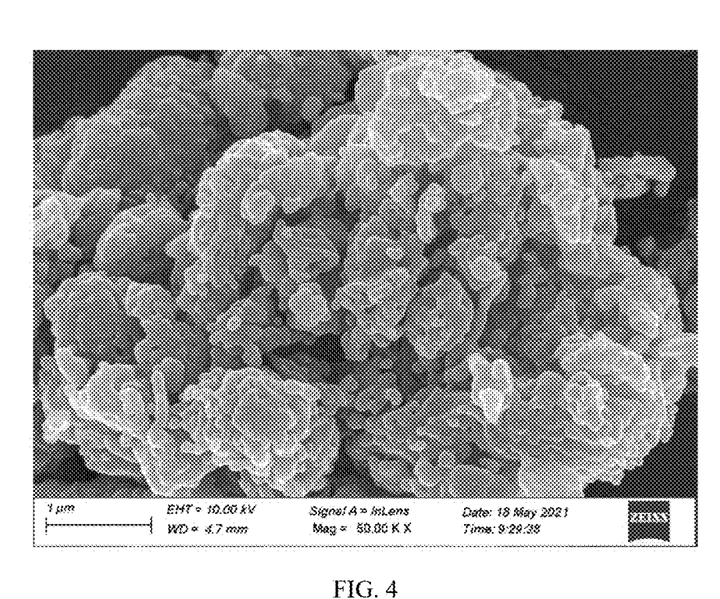
FIG. 4 is a scanning electron microscopy image of the ferric phosphate prepared in Comparative Example 2.

The product obtained from washing was dried and calcined to obtain ferric phosphate. The obtained ferric phosphate product was analyzed, and the results were shown in FIG. 4. FIG. 4 is a scanning electron microscopy image of the ferric phosphate prepared in Comparative Example 2. It can be seen from FIG. 4 that the product prepared by the method provided in Comparative Example 2 showed a sheet-like irregular structure, and had apparent agglomeration and poor consistency.

Example 6

Preparation of a Fe salt: 100 g of scrap iron sludge was subjected to acidolysis using 432 g of 30% concentration of hydrochloric acid, to separate out acid insolubles. Air was blown for 30 min into the acidolysis solution for oxidation. After the oxidation was completed, 12% lime cream solution was added dropwise to the acidolysis solution to neutralize redundant HCl, to which pure water was added to prepare an iron source solution with a Fe concentration of 80 g/L and a pH of 0.5.

A calcium dihydrogen phosphate solution with a $P_2O_5/F$ of 300, P concentration of 28 g/L and a pH of 2.8 was provided.

The Fe salt and P salt were subjected to a synthesis reaction at a ratio of n P/Fe=1.8, in which the synthesis temperature was 60° C., and the synthesis duration was 2 h.

The aging temperature was 96° C., and the aging and crystal transformation duration was 2 h. The synthesis mother solution had a pH of 0.2. After the crystallization was completed, solid-liquid separation was performed using a separation device, and the product was washed by a combination of online washing and pulping washing.

The pH of the mother solution obtained from the separation of the product was adjusted with calcium hydroxide to 10 for neutralization and impurity removal, and the removed slag can be used as white fertilizer. The purified liquid was then added with sulfuric acid, to prepare high-quality calcium sulfate together with hydrochloric acid. The hydrochloric acid was recycled to the initial stage of the acidolysis of waste iron sludge.

Example 7

Preparation of a Fe salt: 100 g of iron slag scrap was subjected to acidolysis using 265 g of 35% concentration of hydrochloric acid to separate out acid insolubles. A theoretical amount of 30% $H_2O_2$ was added to the acidolysis solution for oxidation. After the oxidation was completed, 12% of lime cream solution was added dropwise to the acidolysis solution to neutralize redundant HCl, to which pure water was added to prepare an iron source with a Fe concentration of 40 g/L and a pH of 1.

A calcium dihydrogen phosphate solution with a $P_2O_5/F$ of 260, P concentration of 35 g/L and a pH of 2.65 was provided.

The Fe salt and P salt were subjected to synthesis reaction at a ratio of n P/Fe=1.2, in which the synthesis temperature was 70° C., and the synthesis duration was 1 h. The aging temperature was 94° C., and the aging and crystal transformation duration was 2 h. The synthesis mother solution had a pH of 1. After the crystallization was completed, solid-liquid separation was performed using a separation device, and the product was washed by a combination of online washing and pulping washing.

The pH of the mother solution obtained from the separation of the product was adjusted with calcium hydroxide to 10 for neutralization and impurity removal, and the removed slag can be used as white fertilizer. The purified liquid was then added with sulfuric acid, to prepare high-quality calcium sulfate together with hydrochloric acid. The hydrochloric acid was recycled to the initial stage of the acidolysis of iron slag scrap.

The ferric phosphates prepared after washing in examples and comparative examples were tested for performance. The results are shown in Table 2. Table 2 shows the performance testing results of ferric phosphates prepared after washing in examples and comparative examples.

TABLE 2

Performance Testing Results of Ferric phosphates Prepared after Washing in Examples and Comparative Examples

| Unit | % | | | ppm | | | | | | |
|---|---|---|---|---|---|---|---|---|---|---|
| Items | P | Fe | n Fe/P | Na | K | Ni | Mg | Cu | Zn | Ca |
| HG/T4701-2014 | 16.2-17.2 | 29-30 | 0.97-1.02 | 100 | 100 | 50 | 50 | 50 | 50 | 50 |
| Example 1 | 16.67 | 29.8 | 0.991 | 88 | 78 | 1 | 47 | 1 | 45 | 49 |
| Example 2 | 16.48 | 29.4 | 0.989 | 77 | 76 | 1 | 40 | 1 | 42 | 45 |
| Example 3 | 16.46 | 29.66 | 0.999 | 56 | 65 | 1 | 30 | 1 | 4 | 37 |
| Example 4 | 16.43 | 29.54 | 0.997 | 23 | 43 | 1 | 15 | 1 | 4 | 24 |
| Example 5 | 16.52 | 29.53 | 0.991 | 25 | 32 | 1 | 10 | 1 | 3 | 12 |
| Example 6 | 16.48 | 29.64 | 0.997 | 31 | 35 | 1 | 23 | 1 | 5 | 34 |
| Example 7 | 16.54 | 29.44 | 0.987 | 34 | 25 | 1 | 14 | 1 | 4 | 21 |
| Comparative Example 1 | — | — | — | — | — | — | — | — | — | — |
| Comparative Example 2 | 16.5 | 29.5 | 0.99 | 130 | 122 | 1 | 145 | 1 | 46 | 243 |
| A Certain Product | 16.63 | 29.46 | 0.981 | 165 | 56 | 1 | 176 | 1 | 8 | 12 |

Figure 5:
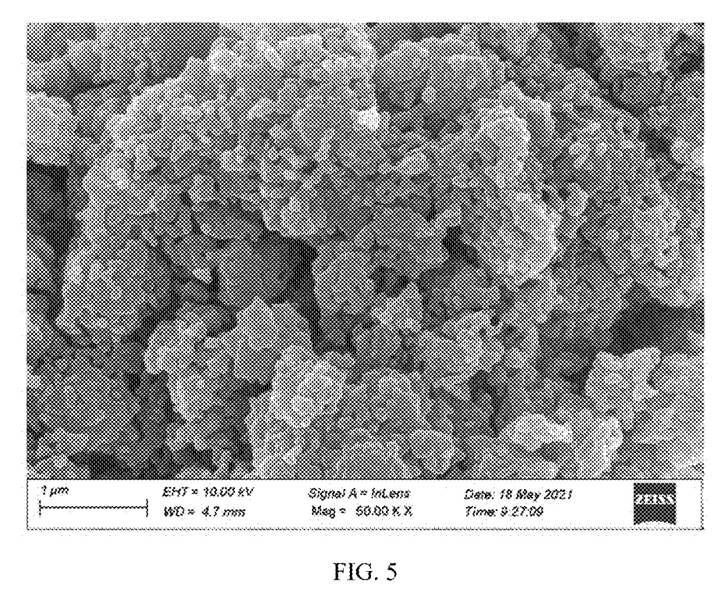
FIG. 5 is an electron microscopy image of a commercially available ferric phosphate product.

In Table 2, a certain product is a commercially available product. Its scanning electron microscope image is shown in FIG. 5. FIG. 5 is an electron microscope image of a commercially available iron phosphate product. The product has a sheet-like irregular structure, apparent agglomeration, and poor consistency.

As can be seen from Table 2, the products obtained in the examples of the present disclosure have a total impurity content ranging from 100 ppm to 350 ppm. The single impurity ion concentration is smaller than the national limit of China. Na ions and K ions are controlled at 20-30 ppm in the optimal example, which is far less than the current standard of the commercially available product. Comparative Example 2 had the same synthesis conditions with Example 3, expect that lime cream was not added to the ferric chloride solution to neutralize redundant HCl. Comparative example 2 was not controlled according to the process of the present invention, such that the contents of the impurities such as Na ions, K ions, Mg ions, Zn ions and Ca ions were far higher than those of the examples of the present invention, and cannot meet the requirements of the national standard of China. In Table 2, a certain product is a commercially available product whose scanning electron microscope image is shown in FIG. 5. FIG. 5 is an electron microscope image of a commercially available iron phosphate product. The product has a sheet-like irregular structure, apparent agglomeration, and poor consistency.

The above descriptions are merely the preferred embodiments of the present disclosure, but the protection scope of the present invention is not limited to this. Within the technical scope revealed by the present invention, all those skilled in the art can make equivalent variations and modifications according to the technical solutions and invention design of the present invention. These equivalent variations and modifications should all fall within the protection scope of this invention.

The invention claimed is:

1. A method of preparing ferric phosphate from iron-containing waste, comprising:
   step a) providing a ferric chloride-containing mixture solution obtained from acidolysis of iron-containing waste;
   step b) adjusting pH of the ferric chloride-containing mixture solution to satisfy $0<pH\leq2$ and $Fe^{3+}$ concentration to 10-80 g/L with an alkaline compound and water, to obtain an iron source solution;
   step c) mixing and reacting the iron source solution obtained from the step b) with a solution of calcium dihydrogen phosphate in a molar ratio of P to Fe of 1:1-1.8, to obtain a slurry with a pH of 0.2-2; and
   step d) performing aging and crystal transformation on the slurry, to obtain ferric phosphate.

2. The method according to claim 1, wherein the ferric chloride-containing mixture solution in step a) comprises $Fe^{3+}$, $Cl^-$ and impurity ions; the impurity ions include one or more of $Mn^{2+}$, $Ni^{2+}$, $K^+$, $Na^+$, $Mg^{2+}$, $Cu^{2+}$, $Zn^{2+}$ and $Al^{3+}$.

3. The method according to claim 2, wherein the ferric chloride-containing mixture solution in step a) comprises 100-200 g/L of $Fe^{3+}$, 200-500 g/L of $Cl^-$ impurity ions; the impurity ions include one or more of $Mn^{2+}$ under 2000 ppm, $Ni^{2+}$ under 500 ppm, $K^+$ under 2000 ppm; $Na^+$ under 2000 ppm, $Mg^{2+}$ under 2000 ppm, $Cu^{2+}$ under 500 ppm, $Zn^{2+}$ under 500 ppm and $Al^{3+}$ under 500 ppm.

4. The method according to claim 1, wherein the iron-containing waste is selected from the phosphorus iron, iron slag scrap, pyrite slag, iron oxide red waste and iron-containing chemical sludge.

5. The method according to claim 1, wherein the alkaline compound in step b) is selected from the group consisting of lime cream, lime and limestone.

6. The method according to claim 1, wherein the calcium dihydrogen phosphate in step c) is prepared from wet-process phosphoric acid and one or more of lime cream, lime, limestone, calcium phosphate and phosphate rock.

7. The method according to claim 1, wherein step d) further comprises solid-liquid separation, and mixing and reacting a mother solution obtained from the separation with an alkaline compound, to obtain a white fertilizer.

8. The method according to claim 7, further comprising:
   mixing and reacting a liquid obtained after separating out the white fertilizer with sulfuric acid, to obtain a white gypsum.

9. The method according to claim 8, further comprising:
   recycling hydrochloric acid obtained after separating out the white gypsum.

10. The method according to claim 1, wherein the mixing and reacting in step c) is performed at a temperature of 60-70° C. for a duration of 0.5-2 h; and
   the aging and crystal transformation in step d) is performed at a temperature of 80-99° C. for a duration of 2-4 h.

* * * * *